Patented Oct. 31, 1950

2,527,714

UNITED STATES PATENT OFFICE 2,527,714

RESINOUS CONDENSATION PRODUCTS OF FURYLETHYLENE DERIVATIVES AND ALDEHYDES

Andrew P. Dunlop, Riverside, and Ernest L. Washburn, Wilmette, Ill., assignors to The Quaker Oats Company, a corporation of New Jersey No Drawing. Application November 1, 1946, Serial No. 707,335. In Canada September 16, 1946

10 Claims. (Cl. 260—67)

This invention relates to novel synthetic resins of the thermosetting type which are formed by reacting formaldehyde, a compound which engenders formaldehyde, or glyoxal with a furylethylene derivative having a terminal monovalent radical selected from the class consisting of H, alkyl, aryl, CHO, COOH, COOR, CN and NO₂. These resins are capable of being manufactured economically into useful articles under readily controlled conditions.

This application is a continuation-in-part of our copending application Serial No. 628,990, filed November 15, 1945.

The resins prepared in accordance with our invention may be used alone or together with other resinous bodies in the preparation of solutions for impregnating and laminating purposes, in the preparation of protective coatings and varnishes, for the formation of molded articles and for other uses which will be apparent to those skilled in the art. In connection with the preparation of molded articles, these resins may be compounded in molding powder form with suitable fillers.

In carrying out the process of the present invention a furylethylene derivative of the type referred to above and described in greater detail below is condensed with formaldehyde or with a compound which engenders formaldehyde such as paraformaldehyde, trioxymethylene, and trioxane, or with glyoxal, or with a mixture of such compounds, in the presence of an acidic catalytic agent. In many instances the condensation reaction may be carried out under reflux conditions at the reflux temperature of the reactants, but in some instances higher temperatures are required. In general, the reaction is effected at an elevated temperature in the order of about 75–140° C., or at higher temperatures, in about one-half to four hours. The reaction proceeds rapidly in an aqueous acid medium. The rate of reaction is, in general, more rapid at the higher temperatures and/or at a relatively low pH. Prior to the condensation the furylethylene derivative may, if required and if desired, be washed to remove water soluble materials, or it may be distilled to remove water and other volatile products.

The ratio of the compound having active methylene groups or of the glyoxal to the furylethylene derivative in the reaction mixture may be varied over a wide range, for example from about 0.5 to about 3.0 mols of the former per mol of the latter.

The materials formed in accordance with this reaction are usually viscous, black resins. In some instances they are fusible solids and in others they are dark-red tacky resins. They can be converted by heat, in the presence or absence of acidic or basic curing accelerators or catalysts, into insoluble, infusible products. The use of curing agents is preferred not only because they accelerate the rate of cure but because in some instances they promote an improved yield of insoluble, infusible product. In the case of the viscous fluid resins, the formation of the infusible, insoluble product proceeds through a rubbery gel state into the final solid state.

The uncured resins are generally soluble in common organic solvents such as acetone, dioxane and ethyl acetate.

The furylethylene derivatives which are used in accordance with the present invention have the general formula

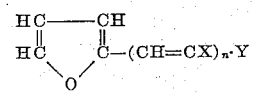

wherein X is a member of the class consisting of hydrogen and a monovalent hydrocarbon radical, $n$ is an integer and Y is a monovalent radical selected from the group consisting of H, alkyl, aryl, CHO, COOH, COOR, CN and NO₂.

The preferred resins in accordance with the present invention are formed when the furylethylene derivative is a compound having the above general formula where the terminal group is CHO. These compounds may be prepared by reacting furfural with an aldehyde having at least one carbon atom which has thereon at least two active hydrogen atoms such as acetaldehyde, propionaldehyde, butyraldehyde, crotonaldehyde, phenylacetaldehyde and the like or mixtures thereof. In general, aldehydes having at least two active hydrogen atoms are those aldehydes having at least two hydrogen atoms on a carbon atom in the alpha position to the aldehyde group or unsaturated aldehydes having active hydrogen atoms due to the influence of a carbon to carbon double bond.

The methods of preparing the simple furylethylene derivatives of the above general formula where the terminal group is CHO are well known as are also the methods of preparing the higher homologs. These higher homologs have been prepared by reacting furfural with mixtures of aldehydes having active hydrogen atoms, such as a mixture of acetaldehyde and crotonaldehyde, for example, or by condensing any of the aforesaid lower homologs with an aldehyde having active hydrogen atoms. Furylethylene derivatives having a terminal aldehyde group have been prepared by progressive condensations of furfural or furylacrolein with acetaldehyde or crotonaldehyde up to the relatively high molecular weight homolog, 15(α-furyl)-pentadecaheptaenal, wherein X=hydrogen and n=7 (refer to general formula above). Schmitt: Ann. 547, 270 (1941) and Konig: Ber. 58, 2559 (1925). Such condensations are, of course, not peculiar to furfural, but are shown by aldehydes in general when reacted with other aldehydes possessing active hydrogen atoms. The mechanism is probably one of aldolization followed by loss of water to form an ethylenic double bond. The simplest ilulstration is the condensation of acetaldehyde with itself to form aldol. By loss of water, aldol yields crotonaldehyde which contains an ethylenic double bond.

A wide variety of catalysts have been used more or less successfully in carrying out such condensations. These include: (1) alkali metal hydroxides, carbonates, acetates and cyanides, (2) those of the Friedel-Crafts type (AlCl$_3$, BF$_3$, etc.), (3) tertiary amines (dimethylaniline, triethanolamine, etc.) and (4) piperidine acetate. Zinc chloride and in some cases acids have also been used to effect such condensations. Any of these catalysts may be employed in preparing the furylethylene derivatives having a terminal aldehyde group which are the preferred starting materials of this invention. For reasons of economy and convenience, however, we prefer to use as catalysts, alkali metal hydroxides such as NaOH or alkali metal carbonates such as Na$_2$CO$_3$.

We prefer to carry out the condensation reaction of furfural and an aldehyde, etc., to form the preferred starting materials of the present invention, at low temperatures, in the order of 0–15° C., for example. At higher temperatures, (in the neighborhood of reflux) there is a tendency for condensation to yield complex mixtures due to side reactions and the mixture, though useful for our purposes, is somewhat less satisfactory than the products obtained at low temperatures. It is preferred to carry out the condensation reactions in an aqueous medium but an organic solvent may be employed, if desired, for example methanol. The products obtained at low or high temperatures and in aqueous or alcoholic medium have been found useful in preparing the novel resins of this invention.

Examples 1 to 5 are illustrative of methods of preparing the preferred starting materials in accordance with the present invention. In these illustrative examples sodium hydroxide is used, for convenience, as the condensing agent, but the other condensing agents may, of course, also be used. In each of the examples in this application, parts indicated are parts by weight.

*Example 1*

Preparation of furylacrolein: A solution containing 384 parts (4 mols) furfural and 193 parts (4+ mols) acetaldehyde (excess of aldehyde to cover evaporation losses) was slowly added over a period of 5 hours to a stirred solution of 30 parts of sodium hydroxide in 1000 parts of water in which 500 parts of ice cubes were suspended. The resulting mixture was adjusted to a pH of 7 with sulfuric acid after which the two layers which formed were separated. The bottom layer was dried by vacuum distillation to yield crude furylacrolein (416 parts or 85 per cent of theoretical). The crude furylacrolein of the example will hereafter be referred to as furylacrolein C.

*Example 2*

Furylpentadienal C was prepared from furfural and crotonaldehyde in a manner similar to the method of preparing furylacrolein C. The yield of furylpentadienal C was 87 per cent of theoretical. The product, prior to drying, is referred to as wet furylpentadienal C.

*Example 3*

Furylacrolein C plus acetaldehyde: A solution containing 30.5 parts (0.25 mol) furylacrolein C and 12 parts (0.25+ mol) acetaldehyde was added over a period of 15 minutes to a stirred solution of 2 parts sodium hydroxide in 10 parts water and 100 parts methanol at 15° C. After stirring for an additional 30 minutes the mixture was neutralized with 10 per cent sulfuric acid and vacuum distilled to remove the methanol. Sodium sulfate was removed by washing with water and the residue was dried under vacuum to yield about 35 parts of sticky, viscous liquid, which crystallized on standing overnight.

*Example 4*

Furylpentadienal C plus crotonaldehyde: A solution containing 37 parts (0.25 mol) furylpentadienal C and 17.5 parts (0.25 mol) crotonaldehyde was theated the same as in Example 3 to yield 45 parts of a very viscous, black product.

It is manifest that propionaldehyde and higher homologs may be used in place of or in admixture with acetaldehyde or crotonaldehyde to yield unsaturated aliphatic aldehydes with terminal furyl groups. Thus, for example, propionaldehyde reacted with furfural yields

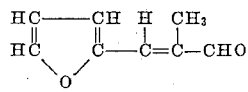

and this compound reacted with additional propionaldehyde yields

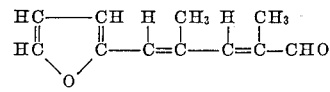

Additionally, phenylacetaldehyde reacted with furfural yields [α-phenyl-β(2-furyl) acrolein]

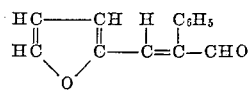

Similar products may be obtained from the higher homologs of phenylacetaldehyde, including products where the X of the above general formula is an aralkyl radical.

*Example 5*

Preparation of α-phenyl-β-(2-furyl)-acrolein: A solution containing 48 parts phenylacetaldehyde (commercial 50% alcoholic solution) (0.20 mol) and 20 parts furfural (0.21 mol) was added dropwise, over a period of 70 minutes, to a well stirred solution of 5 parts NaOH in 250 parts water. The temperature was maintained at 4–10° C., and stirring was continued for a total of 7½ hours, at which time the mixture was adjusted to pH 6 by addition of dilute HCl. The water layer was decanted, and the residual organic layer was washed twice with 200 parts portions of water. This yielded 35.7 parts of a brown, oily liquid from which about 14 parts of the pure compound, B. P. 166–177° C./7.5 mm. ($n_D^{20}$ 1.651), were obtained by fractional distillation.

The compound was also prepared as follows. To a similar solution of phenylacetaldehyde and furfural there was added over a period of 1 hour, a solution of sodium methoxide (2 parts Na metal dissolved in 25 parts methanol). The mixture was stirred and maintained at 15–20° C. for a total of 7½ hours at which time it was brought to pH 6 by addition of dilute HCl. On working this material up in the same manner as above there were obtained 16 parts of the pure compound, B. P. 144–155° C./3 mm. ($n_D^{20}$ 1.644).

The pure products crystallized on standing. They were mixed and reacted with formaldehyde to form a resin as described in Example 10.

Any aldehyde having at least two hydrogen atoms on a carbon atom in the alpha position to the aldehyde group or an unsaturated aldehyde having active hydrogen atoms due to an unsaturated carbon to carbon bond may be substituted for acetaldehyde in Example 3 or for crotonaldehyde in Example 4. Thus, for example, crotonaldehyde may be used in lieu of the acetaldehyde of Example 3 and acetaldehyde in lieu of the crotonaldehyde of Example 4.

The following examples illustrate the preparation of resinous products from furylethylene derivatives having a terminal aldehyde group.

*Example 6*

731 parts (6 mols) furylacrolein C, 486 parts formalin (6 mols $CH_2O$) and 28 parts of concentrated hydrochloric acid were placed in a flask fitted with a reflux condenser and heated at about 80° C., while stirring, for a period of 37 minutes. At this time the reaction mixture was cooled and adjusted to a pH of 7 with sodium carbonate. The mixture stratified into two layers. These were separated and the resin layer was washed several times with cold water. 879 parts of a wet, viscous, black resin were obtained. On curing this resin for 20 hours at 110° C. followed by six hours at 190° C., a solids yield of 53 per cent was obtained. This yield was increased to 59 per cent by curing in the presence of 4 per cent hexamethylenetetramine or 1½ per cent sodium hydroxide. In each case, the cured product was a hard, shiny black, infusible and insoluble resin.

*Example 7*

740 parts (5 mols) furylpentadienal C, 406 parts of formalin (5 mols $CH_2O$) and 18 parts concentrated hydrochloric acid were heated in a manner similar to that employed in Example 6. The reaction mixture was maintained at 85–90° C. for 25 minutes, after which it was cooled and neutralized with sodium carbonate. After washing with water there was obtained 913 parts of a wet, viscous, black resin. The solids yield on curing as above was 62 per cent.

*Example 8*

17.7 parts of the product of Example 3, 20.8 parts formalin (7.5 parts $CH_2O$) and 2.5 parts of 2.4 normal hydrochloric acid were heated under reflux on a steam bath for one hour which treatment carried the resin through the viscous stage to a rubbery gel. The solids yield on curing as above was 81.2 per cent based on the weight of the reactants.

*Example 9*

17.4 parts of the product of Example 4, 10.4 parts formalin (3.75 parts $CH_2O$) and 1.25 parts of 2.4 normal hydrochloric acid were heated under reflux on a steam bath for 40 minutes, yielding a wet, viscous resin. On drying under vacuum 18.2 parts of a viscous product were obtained which gave a yield of 62 per cent solids on curing as before.

*Example 10*

5 parts (0.025 mol) of the mixed product of Example 5, 4.05 parts of formalin (0.05 mol $CH_2O$) and about 1 part of 6 N HCl were treated on an oil bath under reflux conditions at 125°±5° C., for 4½ hours. At this time the bottom layer was a very viscous black resin. On cooling it solidified to a grindable, fusible resin (5.86 parts after washing and drying under vacuum) soluble in acetone, dioxane and ethyl acetate, and insoluble in methanol in the cold. On heating a portion (2.0 parts) of this resin in an oven at 190°±5° C., for 18 hours, there were obtained 1.70 parts of a cured product which was not quite hard when hot. When portions of this resin were heated in the presence of $H_3PO_4$ and NaOH the cure was effected much more rapidly.

The following examples illustrate the preparation of resinous products in accordance with the present invention, from furylethylene derivatives corresponding to the above general formula where the terminal group is a monovalent radical other than an aldehyde.

*Example 11*

4.7 parts (0.05 mol) of vinylfuran, 4.0 parts formalin (0.05+ mol $CH_2O$) and about 0.5 part of 2 N HCl were sealed in a glass tube and heated for a total of two hours at 95–106° C. The resulting resin was tacky and had a dark-red color. The tube was opened and the contents were heated at 180–185° C. for 16 hours, yielding a dark-red, infusible resin.

*Example 12*

6.90 parts (0.05 mol) of furylacrylic acid, 4.0 parts formalin (0.05+ mol $CH_2O$) and about 1 part of 6 N HCl were sealed in a glass tube and heated at 95–106° C. for three hours and then at 120–140° C. for one hour. The tube was opened and the contents were heated at 180–185° C. for 16 hours, yielding a hard, black infusible resin.

*Example 13*

Nitrovinyl furan was prepared by condensing furfural with nitromethane in accordance with the procedure described for the preparation of nitrostyrene (Worrall, Org. Syntheses, Coll. vol. I, page 405).

6.95 parts (0.05 mol) of nitrovinylfuran prepared as described above, 4.0 parts of formalin (0.05+ mol $CH_2O$) and about 1 part of 2 N HCl were sealed in a glass tube and heated at 95–106° C. for three hours and then at 120–140° C. for one hour. The tube was opened and the contents, essentially a black rubbery resinous mass, were heated at 180–185° C. for 16 hours, yielding a hard, black resin. The rubbery resin converted to the hard final form without melting initially.

Resins similar to those described in the foregoing examples are prepared by reacting other furylethylene derivatives with formaldehyde, glyoxal, etc., in the presence of hydrochloric acid or other acid catalyst, in accordance with the procedures described above. Thus, thermosetting resins are formed by condensing formaldehyde with furylacrylonitrile and esters of furylacrylic acid such as n-amyl furacrylate, n-butyl furacrylate, methyl furacrylate, ethyl furacrylate, etc., in the presence of hydrochloric acid.

as being 100 per cent. These represent the amount of $CH_2O$ reacted when the resin is carried to a solid stage. At the intermediate stages the value is less so that it may be advisable in using these resins in a viscous, fluid state to incorporate paraformaldehyde or the like with the varnish or molding compound.

| Wet Furyl-Pentadenial C | Catalyst | $CH_2O$ as Formalin | Total heating time | Cured Solids Yield, Per Cent | Mols $CH_2O$ reacted per mol Furylpentadienal C |
|---|---|---|---|---|---|
| | | Mol | Hours | | |
| 19.7 parts 0.125 mol on dry basis | $BF_3$ (1.1 parts) | 0.125 | 2 | 75.5 | 0.80 |
| Do | Oxalic acid (0.5 part) | 0.125 | 4 | 72.7 | 0.85 |
| Do | Maleic anhydride (0.5 part) | 0.125 | 3 | 75.5 | 0.84 |

Similar resins are similarly prepared by condensing ω-methyl-vinylfuran, ω-phenyl-vinylfuran and like compounds with formaldehyde, glyoxal, etc.

The compound ω-methyl-vinylfuran was prepared by reacting furfural with ethyl propionate, treating the resulting product with sodium hydroxide to form a salt, acidifying the salt and then decarboxylating it. The corresponding aryl compound was similarly prepared, using, however, ethyl phenylacetate, instead of ethyl propionate.

In accordance with our invention, the hydrochloric acid of the foregoing examples may be replaced by sulfuric acid, phosphoric acid, boron trifluoride, oxalic acid and maleic acid. In general, it was found that the rate of reaction was increased by increasing the concentration of the catalyst. With phosphoric acid as the catalyst, the best results are obtained at reaction temperatures above about 100° C.

The following is illustrative of some aspects of the invention heretofore referred to.

Wet furylpentadienal C was reacted with formalin using different materials listed in the table below as catalysts. The ingredients were heated in sealed tubes at 110°-145° C. and then the resulting products were worked up to determine (a) unreacted formaldehyde, and (b) yield of cured solids.

Ingredients:
⅛ mol equivalent of wet furylpentadienal C.
⅛ mol $CH_2O$ as formalin
Catalyst as indicated in the table below.

The tubes were inspected every hour. When any particular composition had progressed to a solid state it was heated for one hour additional. After this period each of the tubes was opened, the liquid portion (if any) poured off and the solid resin washed with water. Liquid and washings were then analyzed for formaldehyde. The solid resin was dried, finely ground and a portion of the ground product was leached overnight with water to dissolve any unreacted formaldehyde which was determined by the hydroxylamine-hydrochloride method. Blanks, with no formaldehyde added, were also run in order to correct for any water-soluble aldehydes that might have come from the unsaturated aldehyde having a terminal furyl group. The results necessitated a correction of −0.2 to −0.3 part in order to obtain a true value for the $CH_2O$ recovered. The cured solids yield was obtained by heating the ground resin at 190° C. for 6 hours. The values listed in the following table are based on the furylethylene derivative having a terminal aldehyde group plus $CH_2O$ In similar sealed tube experiments, where the mol ratio of $CH_2O$:furylpentadienal C was, respectively, 2:1 and 3:1, the catalyst was HCl (3 cc. of 2.5 N HCl per mol furylpentadienal C) and the heating time was 2 hours, hard resins were obtained which yielded 75% and 73.6%, respectively, of cured solids, using the procedure described above. The mols of $CH_2O$ reacted per mol of furylpentadienal C were, respectively, 1.81 and 2.88. In these experiments where a 2:1 mol ratio of $CH_2O$ was used, one-half of the $CH_2O$ was supplied as formalin and the other half as paraformaldehyde. Where a 3:1 mol ratio of $CH_2O$ was used, one-third of the $CH_2O$ was supplied as formalin and the balance as paraformaldehyde.

Our invention is not to be construed as limited to the specific conditions, proportions and details set forth in the foregoing illustrative examples except insofar as such limitations are specified in the appended claims.

We claim:

1. A new artificial thermosetting resin comprising the product of condensation under acidic conditions of formaldehyde with a furylethylene derivative corresponding to the general formula

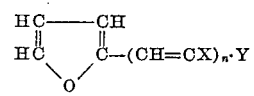

wherein X is a member of the class consisting of hydrogen and a monovalent hydrocarbon radical, $n$ is an integer and Y is a monovalent radical selected from the class consisting of H, alkyl, aryl, CHO, COOH, COOR, CN and $NO_2$, and wherein the R of COOR is a monovalent alkyl radical, in the proportion of about 0.5 to 3.0 mols of the aldehyde per mol of the said furylethylene derivative.

2. The new artificial thermosetting resin of claim 1 wherein X and $n$ are as in claim 1 and Y is H.

3. The new artificial thermosetting resin of claim 1 wherein X and $n$ are as in claim 1 and Y is alkyl.

4. The new artificial thermosetting resin of claim 1 wherein X and $n$ are as in claim 1 and Y is aryl.

5. A new artificial thermosetting resin comprising the product of condensation under acidic conditions of glyoxal with a furylethylene derivative as designated in claim 1.

6. A new artificial thermosetting resin comprising the product of condensation under acidic conditions of a compound of the class consisting of formaldehyde, compounds which engender formaldehyde and glyoxal with a furylethylene derivative corresponding to the general formula

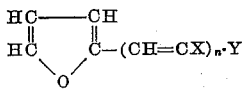

wherein X is a member of the class consisting of hydrogen and a monovalent hydrocarbon radical, $n$ is an integer and Y is a monovalent radical selected from the class consisting of H, alkyl, aryl, CHO, COOH, COOR, CN and $NO_2$, and wherein the R of COOR is a monovalent alkyl radical, in the proportion of about 0.5 to 3.0 mols of the aldehyde per mol of the said furylethylene derivative.

7. The method of making artificial thermosetting resins comprising condensing, in an acid medium, formaldehyde with a furylethylene derivative as designated in claim 6, until a resin is formed which is capable of being converted to the infusible state under the influence of heat, and then interrupting the condensation reaction.

8. The method of making artificial thermosetting resins comprising condensing, in an acid medium, glyoxal with a furylethylene derivative as designated in claim 6, until a resin is formed which is capable of being converted to the infusible state under the influence of heat, and then interrupting the condensation reaction.

9. The method of making artificial thermosetting resins comprising condensing, in an acid medium, a compound of the class consisting of formaldehyde, compounds which engender formaldehyde and glyoxal with a furylethylene derivative as designated in claim 6, until a resin is formed which is capable of being converted in the infusible state under the influence of heat, and then interrupting the condensation reaction.

10. A new artificial thermosetting resin comprising the product of condensation under acidic conditions of formaldehyde with a furylethylene derivative corresponding to the general formula

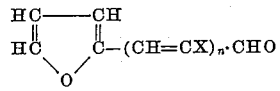

wherein X is a member of the class consisting of hydrogen and a monovalent hydrocarbon radical, and $n$ is an integer, in the proportion of about 0.5 to 3.0 mols o fthe aldehyde per mol of the said furylethylene derivative.

ANDREW P. DUNLOP.
ERNEST L. WASHBURN.

REFERENCES CITED

The following references are of record in the file of this patent:

UNITED STATES PATENTS

| Number | Name | Date |
|---|---|---|
| 1,873,599 | Kappeler | Aug. 23, 1932 |
| 2,278,635 | Barnes | Apr. 7, 1942 |
| 2,345,966 | Fiedler | Apr. 4, 1944 |
| 2,372,233 | Thurston | Mar. 27, 1945 |

FOREIGN PATENTS

| Number | Country | Date |
|---|---|---|
| 487,604 | Great Britain | June 22, 1938 |

OTHER REFERENCES

Walker Formaldehyde, page 139 (1944), Reinhold Pub. Corp., New York.

Certificate of Correction

Patent No. 2,527,714 October 31, 1950

ANDREW P. DUNLOP ET AL.

It is hereby certified that error appears in the printed specification of the above numbered patent requiring correction as follows:

Column 3, line 16, for "ilulstration" read *illustration*; column 4, line 31, for "theated" read *treated*; column 7, line 65, strike out "The tubes were inspected every hour. When any";

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*